(No Model.)

W. M. THOMAS.
AUTOMATIC ELECTRICAL CUT-OUT.

No. 300,532. Patented June 17, 1884.

WITNESSES
Wm A. Skinkle
Alfred C. Newman

INVENTOR
William M. Thomas,
By his Attorneys
Baldwin, Hopkins & Peyton.

UNITED STATES PATENT OFFICE.

WILLIAM M. THOMAS, OF GRAND RAPIDS, MICHIGAN.

AUTOMATIC ELECTRICAL CUT-OUT.

SPECIFICATION forming part of Letters Patent No. 300,532, dated June 17, 1884.

Application filed December 10, 1883. (No model.)

*To all whom it may concern:*

Be it known that I, WILLIAM M. THOMAS, of Grand Rapids, in the county of Kent and State of Michigan, have invented a new and useful Improvement in Electric Cut-Outs for loops in which incandescent or other electric lamps, motors, and appliances are attached, of which the following is a specification.

My invention relates to a mechanism for automatically shunting or cutting out a loop of incandescent lamps or other appliances used in multiple-arc series when one or more lamps composing such loop burn out or become disconnected, such cut-out thereby preventing damage to the remaining lamps or appliances, which would ordinarily receive in such case an excessive current of electricity.

Figure 1:
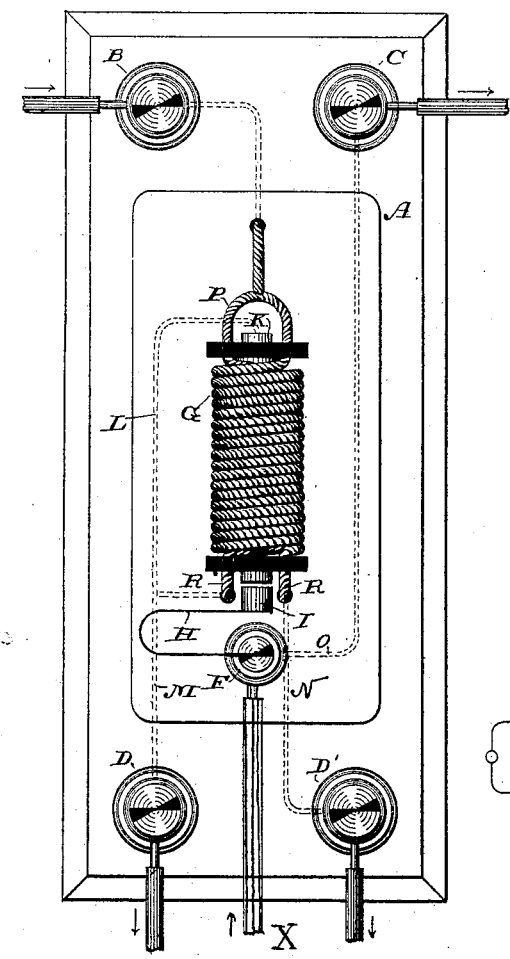
Figure 2:
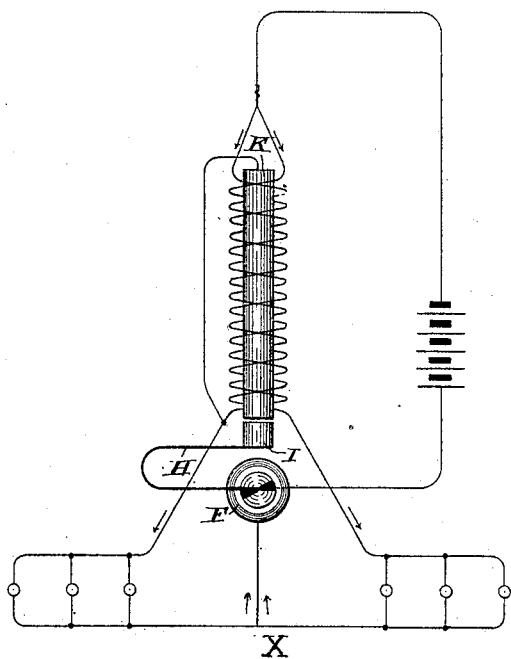

The annexed drawings illustrate my invention, Figure 1 being a front elevation of apparatus embodying it, and Fig. 2 showing connections with a loop.

Referring to the letters on the drawings, A is the base supporting the mechanism. B is a binding-post receiving the positive line-wire through which the current proceeding from any source of electrical energy enters and passes to wire or loop P, which is the approximate center of the wire composing helix G. The electric current normally divides at this point and passes through the branches of wire composing helix G, which is formed of a spool or bobbin wound with a single wire in two layers in opposite directions, or it may be in the same direction, provided the current passes through the helix on the layers in opposite directions. It will be seen that the electric current, after dividing, passes around the helix in opposite directions, then along conductors M N (indicated by dotted lines) to binding-post D and D'. From D and D' it normally passes through the lamps in the loop, as indicated in diagram Fig. 2. The loop out through conductor X and binding-post F to line is composed of a series of lamps, motors, or other electric appliances equally divided, and the apparatus is so connected as normally to pass the current through one of the branches, R R, of the wire composing helix G to one half the electric lamps, motors, or other electric appliances in use, and through the other branch of wire composing helix G to the other half of electric lamps, motors, or other electric appliances composing said loop. It will be seen that in this condition the core K will be neutral; but should one of these lamps, motors, or electric appliances in use in the loop become disconnected or become inoperative through any cause, a less portion of the current would pass through the wire or branch of the helix leading to that portion of the loop where the appliance was disconnected or inoperative, thus diminishing the flow of current in that branch of the loop, and a greater amount of current would flow through the opposite branch of the helix-wire. This disturbance of equilibrium would result in magnetizing core K and bringing armature I in contact with core K, armature I being connected with the negative wire of the loop at binding-post F through spring H. Core K receives a positive connection from the negative end of one of the wires or branches of helix shown in diagram Fig. 2, at L, and this shunts the loop through one of the branches or wires of the helix through core K, through armature I, through binding-post F and wire O to binding-post C and the negative line. The current, being shunted through one of the wire branches of the helix, holds armature I in firm contact with core K until the disconnected lamps are replaced. Then the cut-out readjusts itself to its normal position. Should the loop be short-circuited in any manner, the cut-out would act in a like manner as described above.

I am aware of the United States Patent No. 230,346, granted July 20, 1880, which provides a cut-out and for continuing the current through one half the lamps when the other half is cut out; but this is not my invention, and I disclaim it accordingly, my devices being designed and arranged for shunting the circuit from the loop, as already described, which I regard as a material improvement.

Having thus described my invention, what I claim as new, and desire to secure by Letters Patent of the United States, is—

1. The combination, substantially as set forth, of the main circuit, the double wound helix in which the electric current from the main line is normally divided, the loop-circuit, a series of lamps or other electrical appliances contained in the loop, conductors for conveying one branch or division of the current to a given number of the lamps or other appliances, conductors for conveying the other division of the current to the remaining appliances, and a shunt-circuit, substantially such as described, whereby the entire current is shunted and cut out from all the appliances whenever a disturbance or disarrangement occurs in one branch of the loop-circuit.

2. The combination, substantially as set forth, of the main circuit, the double wound helix in which the electric current from the main line is normally divided, the core of the helix, its armature, the loop-circuit, an electrical connection between the loop and the main line, an electrical conductor jointed to one branch of the circuit between the helix and the loop and to the core, and an electrical connection between the armature and the main line, whereby the entire current will normally pass into the loop, but will be shunted and cut out from the loop whenever a disturbance or disarrangement occurs therein.

In testimony whereof I have hereunto subscribed my name this 15th day of November, A. D. 1883.

W. M. THOMAS.

Witnesses:
J. H. WALKER,
WM. H. POWERS.